L. W. FREDERICK.
Horse Rake.
No. 67,523. Patented Aug. 6. 1867.
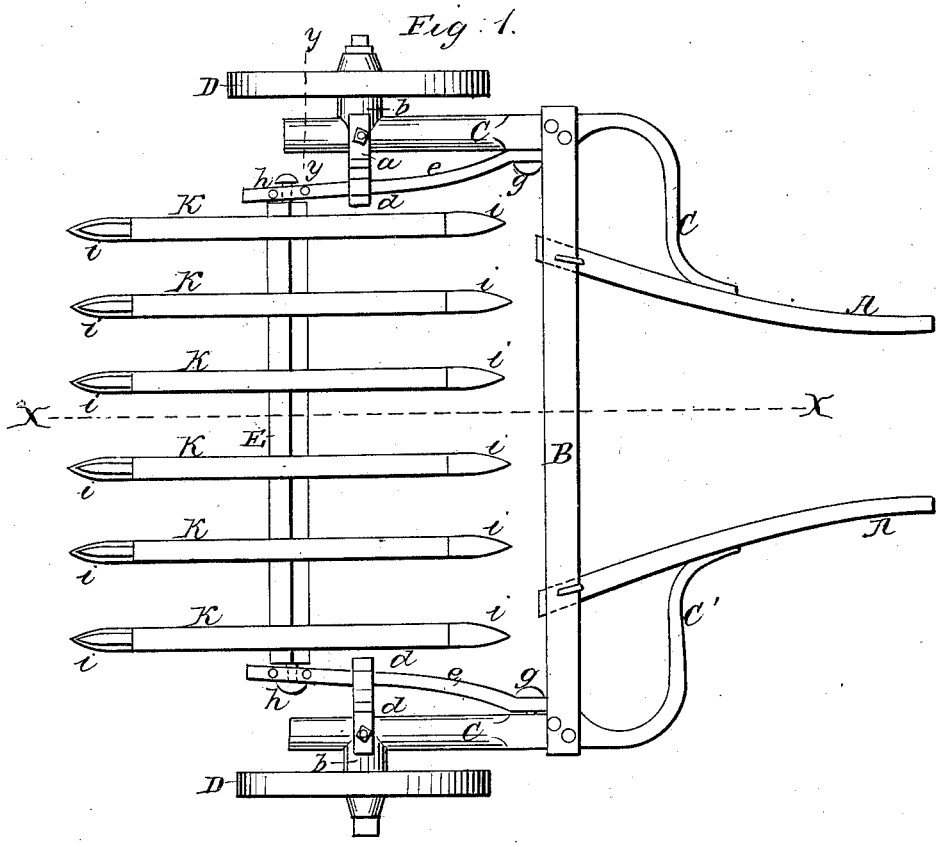
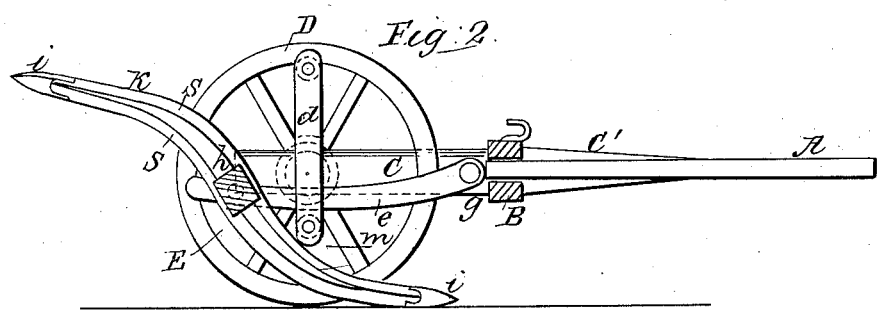
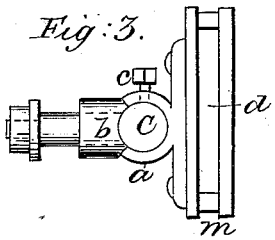
Witnesses:
Theo Tuche
Wm Trewin
Inventor.
L W Frederick
Per Munn
Attorneys

United States Patent Office.

LEVI W. FREDERICK, OF GOSPORT, INDIANA.

*Letters Patent No. 67,523, dated August 6, 1867.*

---

IMPROVEMENT IN HORSE-RAKES.

---

*The Schedule referred to in these Letters Patent and making part of the same.*

---

TO ALL WHOM IT MAY CONCERN:

Be it known that I, LEVI W. FREDERICK, of Gosport, in the county of Owen, and State of Indiana, have invented a new and useful Improvement in Horse-Rakes; and I do hereby declare that the following is a full, clear, and exact description thereof, which will enable others skilled in the art to make and use the same, reference being had to the accompanying drawings, forming part of this specification, in which—

Figure 1 is a plan or top view of my improved horse-rake.

Figure 2 is a longitudinal section of the same, taken in the line $x\ x$, fig. 1.

Figure 3 is a partial section, taken in the line $y\ y$, fig. 1.

Similar letters of reference indicate like parts.

This invention relates to improvements in the construction of revolving horse hay-rakes, wherein great simplicity and economy are combined with great strength and durability, producing an implement which is managed easily and works perfectly on any kind of ground, whether the surface is smooth or rough. It is light and portable, can be made very cheaply, and by its effective operation in the field in hay-making, will supply the farmer with an invaluable labor-saving machine.

My improved hay-rake is designed for one horse, and the thills A A are bolted at their rear ends to a double front cross-bar, B, formed of slats above and below, with the ends of the thills between them. The hounds C C are also bolted to the ends of the cross-bar B, between the upper and lower slats, from which point they are tapered and curved inward, with their forward ends C' bolted to the outside of the thills in such manner as to brace them firmly, as shown clearly in fig. 1. The rear ends of the hounds C C are made round and stout, and pass through rings $a\ a$, which are made in the short axles $b\ b$ of the wheels D D. The hounds are made so that they may be adjusted in the rings on the axles to bring the wheels forward more or less, for regulating the balance or equipoise of the rake, and are held securely in place at any desired point by set-screws $c\ c$, which pass through the rings $a\ a$ and bear on the hounds. On the inside ends of the short axles $b\ b$, or outside of the rings $a\ a$, are secured upright guides $d\ d$ for the draught-bars $e\ e$, which are pivoted at their front ends on wrists $g\ g$, to the inner sides of the hounds C C, in such manner as to allow the guides $d\ d$ to play freely on the draught-bars $e\ e$ by the rising and falling of the wheels D D, while the rake retains its position on the ground, and also to allow the draught-bars $e\ e$ to play freely up and down in the guides $d\ d$, for the rake-head to rise and the rake to turn over when loaded. The rake-head E is a solid square beam, and is hung at each end by a headed gudgeon, $h$, let into the rear ends of the draught-bars $e\ e$, and secured in such manner that the rake-head may be taken out instantly, when required. The guides $d\ d$ are arranged with adjustable blocks $m\ m$ in the lower ends, for setting the rake-head E higher or lower, as required. The rake-teeth $k\ k$ are made each in two flat pieces $s\ s$, fig. 2, which are bent and bolted together at their ends, so as to form them somewhat in an S-shape, or with reverse curves in them, by which one end is elevated, and points back from the rake-head in nearly a horizontal position, while the lower end bears upon the ground to run under the hay, as shown in fig. 2. The teeth are pointed with malleable iron points $i\ i$, made bevelling to clear the ground easily, and are fastened with screws or rivets. The teeth $k\ k$ are secured to the rake-head E by bolting them to it on its opposite sides, at their centre, with two bolts in each, passing through, and thus clamping and bracing the rake-head in the most thorough manner, as shown clearly in fig. 2.

Having thus described my invention, what I claim as new, and desire to secure by Letters Patent, is—

1. The arrangement of the thills A A, the double cross-bar B, and the outside hounds C C, in combination with the rings $a\ a$ and the short axles $b\ b$ of the driving-wheels D D, constructed and forming together a compact, light, and strong body for attaching a horse hay-rake, as herein described.

2. The adjustable rings $a\ a$, in combination with the axles $b\ b$ and the hounds C C, arranged and operating as herein set forth.

3. The swinging draught-bars $e\ e$, in combination with the hounds C C. the adjustable guides $d\ d$, and the rake-head E, arranged and operating as herein described.

LEVI W. FREDERICK.

Witnesses:
 LEVI WHITAKER,
 SCOTT W. YOUNG.